United States Patent Office 3,000,766
Patented Sept. 19, 1961

---

3,000,766
METAL CLEANING PROCESS
Eugene Wainer, Cleveland Heights, Ohio, assignor to Horizons Incorporated, Cleveland, Ohio, a corporation of New Jersey
No Drawing. Filed Apr. 28, 1958, Ser. No. 731,124
2 Claims. (Cl. 134—2)

This invention relates to the recovery of metal values in waste materials. More particularly it relates to the salvaging of metal from accompanying organic non-metallic material associated therewith by treatment in a fused salt medium maintained at a temperature below the melting point of the metal being treated and under other suitable operating conditions.

One object of my invention is to separate industrial waste materials into a recoverable solid metal portion and a disposable non-metallic residue.

Another object of my invention is to provide a means for maintaining the efficacy of the fused salts bath used in the treatment of the scrap.

Still another object is to provide a method wherein organic materials associated with the scrap, usually in the form of coatings, are caused to burn without accompanying objectionable pollution of the atmosphere, leaving the scrap as a cleaned solid product.

These and other objects will become more apparent from the following description of the invention.

In our present complex society much effort is devoted to the extraction of metals from their ores and to their ultimate incorporation in such useful devices as electrical equipment, cables, conduits, fittings, containers and a host of other end items. When for one reason or another the end item has served its useful life or has become technologically obsolete, it is often dumped on a junk heap principally because the cost of recovering the metal exceeds its resale value. This is particularly true when the metal is in the form of small pieces of wire or armored cable or small parts coated with lacquers, paints, rubber, plastics or other organic materials, or glass wool, enamel or ceramic coatings.

One prior art approach to the recovery of the metals has been a burning and melting operation in which the waste has been charged into a metallurgical type furnace for remelting. In this approach the combustibles burn first, as the waste material charged is heated, usually with copious evolution of black smoke. Inorganic contaminants must be fluxed to insure separation of the metal and hence represent an added economic disadvantage to the process which is burdened with a high fuel and equipment cost. In addition, after the coating materials have been burned off, the metallic portion of the charge is heated until it has melted and the resulting alloy product often presents a difficult separation problem, particularly if the individual metals are to be recovered.

In place of any such expensive treatment others have suggested the use of fused salt baths as a means for removing the various organic and inorganic coating materials commonly found associated with the scrap metal. Among the materials for which a preference has been expressed are caustic (United States Patent 528,156), alkali metal nitrites or nitrates (United States Patent 1,714,879) and mixtures of such salts (United States Patents 2,395,694 and 2,458,660 and '661 and others).

In working with fused salt mixtures consisting principally of alkali metal nitrite, and containing alkali metal chlorides, sulfates, nitrates and/or hydroxides as additional constituents, it has been found that the efficiency and rapidity with which the bath effects removal of organic materials from the metallic portion of the charge decreases precipitously after the fused salt has been used to process several batches of waste and that, for example, after four or five charges have been treated, the salt bath may require as long as between five and ten times longer to complete the removal of non-metallic material than it required for the processing of material when the salt bath was first used. It was further found that prior art baths were subject to another limitation, namely that a definite limit appeared to exist to the rate at which waste material could be introduced into the molten salt for processing and that when this limiting input was exceeded, the bath operation was rendered visibly slower and less efficient and an appreciable amount of sludge would form.

In accordance with the present invention, the activity or effectiveness of the fused salt bath is maintained at the high level characteristic of the fresh salt bath, and the formation of appreciable amounts of sludge characteristic of an exhausted bath was avoided in a simple and direct manner. Briefly in the process devised by me, streams of fine bubbles of air are introduced into a fused salt melt either intermittently or continuously, whereby it has been found that no appreciable decrease in the activity of the bath can be observed. It will be noted that in the practice of my invention it is not necessary to add solid oxidizing substances as proposed in United States Patents 2,538,702 and 2,630,393 or to use steam as taught in United States Patent 1,829,693.

Fused salt compositions which have been found to retain their effectiveness when treated with air include the compositions shown for purposes of illustration in the following table:

|  | Parts by Weight | | |
| --- | --- | --- | --- |
|  | NaNO$_2$ | NaNO$_3$ | NaOH |
| (A) | 100 |  |  |
| (B) | 75 | 25 |  |
| (C) | 50 | 15 | 35 |

In the above table, the sodium salts are designated, but it is to be understood that while these are preferred because of their lower cost, other alkali metal salts may also be used with corresponding results, and particularly the salts of potassium. Salt mixtures containing the salts of more than one alkali metal are also contemplated as within the scope of my invention.

Air, preferably preheated to about 1000° F. should be introduced continuously into the fused salt cleaning bath. The rate of introduction may be widely varied without adversely affecting the process. Obviously some minimum rate of introduction is necessary to avoid the running down of the bath activity, while some care must be taken to avoid any excessive rate of introduction, sufficient to cause splashing or spattering of the salt. While I prefer to introduce the air into the bath during actual treatment of the work, it will be understood that the air may be introduced between processings of metal being cleaned.

The following examples will serve to further illustrate the present invention and are to be taken as illustrative rather than limitative of the invention.

*Example 1*

A fused testing bath was prepared by melting approximately 75 pounds of sodium nitrite in a fourteen inch diameter steel pot. The resulting five (5) gallon melt was further heated to raise it to about 800° F. at which time a flow of air into the bath was begun. The rate of introduction was about 2 cubic feet per minute, the air being introduced through a diffuser by means of which the air stream was broken up into a multitude of fine bubbles. Two pounds of cut aluminum wire scrap, composed of wire having a neoprene or rubber coating constituting between 1/3 and 1/2 the weight of the material charged, was charged into a porous metal basket. The basket was lowered into the fluid melt and remained therein for 15 minutes. To promote contact between the scrap and the salt bath, the basket was raised and lowered in the melt, from time to time. The fume and smoke evolved were conducted to a chamber in order to complete the combustion process. The resulting white-to-colorless gas was discharged into the atmosphere without objectionable pollution.

The basket was removed from the bath and quenched in a tank of water which cooled the metal and removed all traces of salt from the product. The metal was then dried and was ready for analysis and sale.

The above treatment was repeated 22 times with other charges of coated metal scrap without any noticeable deterioration in the operation of the bath. Where the charge included a diversity of scrap materials, the clean dried product was readily hand sorted to segregate it into aluminum-, copper-, and iron-base constituents.

*Example 2*

The pot was emptied and a fresh charge of sodium nitrite was melted. After the bath was heated to about 800° F., treatment of a series of charges was begun as in Example 1, except that no air was bubbled into the bath. After the fourth batch was processed, it was noted that the time required to clean the material began to increase substantially, so that instead of less than 15 minutes for a batch, it required over 30 minutes to remove the insulating coatings when processing batches after the seventh. It was also observed that the batch began to be discolored by an accumulation of sludge.

It was found that the activity of the bath could be restored in large measure by bubbling air through the bath.

Having now described the best mode contemplated by me for the practice of my invention, in accordance with the patent statutes, I claim:

1. A process for removing adherent non-metallic adherent organic materials from pieces of metal to which they are bonded which comprises: preparing a fused salt melt consisting principally of alkali metal nitrite; immersing the pieces of metal with accompanying non-metallic material in said melt, while maintaining the melt at a temperature below the melting point of the metal and then withdrawing the metal from said melt after the non-metallic organic material has been removed therefrom; and maintaining the coating-removing efficiency of said fused nitrite melt by bubbling air into said melt.

2. The process of claim 1 wherein the air is preheated before introduction into the salt bath.

References Cited in the file of this patent

UNITED STATES PATENTS

| | | |
|---|---|---|
| 1,430,878 | Ballantine | Oct. 3, 1922 |
| 1,714,879 | Lang | May 28, 1929 |
| 2,564,037 | Slottman | Aug. 14, 1951 |
| 2,653,883 | Thomas | Sept. 29, 1953 |
| 2,676,900 | Spence | Apr. 27, 1954 |
| 2,738,294 | Spence | Mar. 13, 1956 |
| 2,832,703 | Bell et al. | Apr. 29, 1958 |